PARMELE & PATTERSON.
Wheel-Cultivator.
No. 54,763. Patented May 15, 1866.
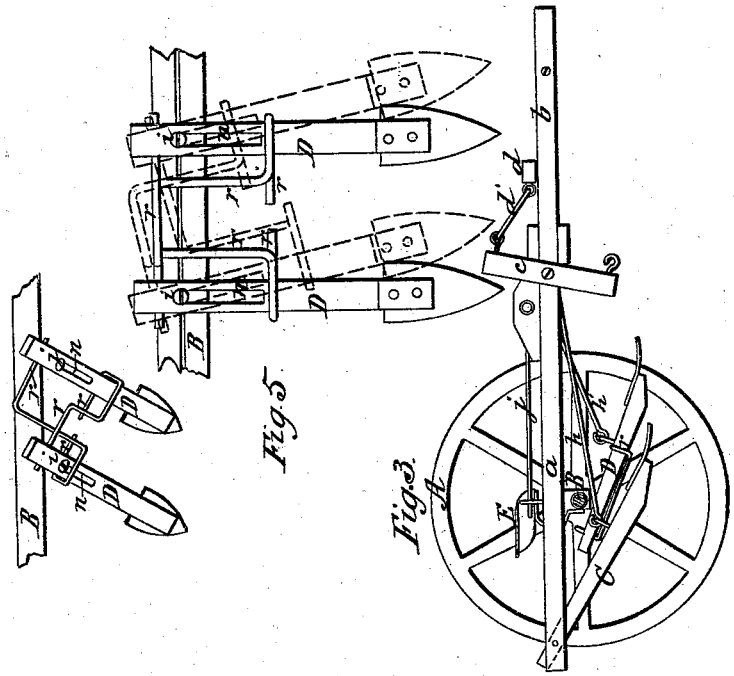
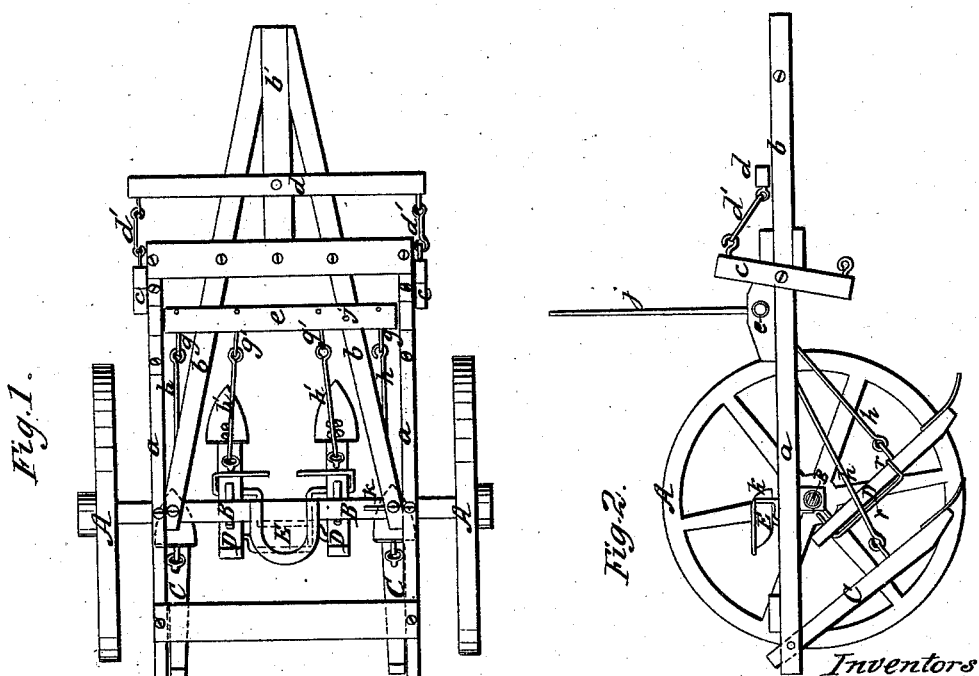
Inventors.
E. Parmele
R. N. Patterson
by their Atty.
Mason Fenwick & Lawrence

UNITED STATES PATENT OFFICE.

EDWIN PARMELE AND R. N. PATTERSON, OF DAVENPORT, IOWA.

IMPROVEMENT IN CULTIVATORS.

Specification forming part of Letters Patent No. 54,763, dated May 15, 1866.

*To all whom it may concern:*

Be it known that we, EDWIN PARMELE and R. N. PATTERSON, of Davenport, in the county of Scott and State of Iowa, have invented a new and Improved Cultivator; and we do hereby declare that the following is a full, clear, and exact description thereof, reference being had to the accompanying drawings, making a part of this specification, in which—

Figure 1 is a plan view of the improved cultivator. Fig. 2 is a side elevation of the same, with one of the transporting-wheels removed. Fig. 3 is a view similar to Fig. 2, showing the shovel-standards thrown up. Fig. 4 is a view, in detail, showing the manner of attaching the shovel-standards to the axle-tree of the carriage. Fig. 5 is a view similar to Fig. 4, showing the shovel-standards in different positions.

Similar letters of reference indicate corresponding parts in the several figures.

This invention relates to certain novel improvements on gang-cultivators which have their teeth or shovels attached to a carriage upon which the attendant rides.

By the invention, which we will hereinafter describe, we provide for allowing the shovel-standards to rise and fall freely, and also for allowing the driver, while sitting upon the machine, to regulate the depth at which it is desired the shovels should run in the ground. At the same time, should the shovels strike an obstruction, they will rise over it without being injured. This part of our invention relates to the shovels which are adapted to run nearest the rows of plants. We also provide for allowing the driver to give a lateral motion to shovel-standards, which are allowed to rise and fall, so that he can guide the shovels along uneven rows and at the same time hold them down to their work with his feet, as will be hereinafter described.

To enable others skilled in the art to understand our invention, we will describe its construction and operation.

In the accompanying drawings, A A are the two transporting-wheels, and B the axle-tree of the carriage, to which the shovel-standards are attached.

The carriage-frame consists of two longitudinal beams, $a\ a$, which extend across the axle-tree B, and are rigidly secured to it. These beams are secured together by means of forward and rear transverse beams, and they are all braced by means of the hounds $b\ b$, which are secured at their rear ends to the axle-tree, and at their forward ends to the forward portion of the frame, as shown in Fig. 1, and also the draft-pole $b'$.

The horses are hitched to the lower ends of two upright levers, $c\ c$, which are pivoted to the sides of the beams $a\ a$, and which are connected to the horizontal transverse lever $d$ by means of links $d'\ d'$. The lever $d$ is pivoted at the middle of its length to the draft-pole $b'$, and it serves as an equalizer for relieving the animals from lateral draft.

In rear of the equalizer $d$ is a transverse roller, $e$, which has its bearings upon the longitudinal beams $a\ a$, and from which project four eyebolts, $g\ g\ g'\ g'$, to which the drag-rods $h\ h\ h'\ h'$ are linked. These rods are linked at their rear ends to eyes which are secured to the shovel-standards C C D D, for the purpose of sustaining these standards against backward thrust. To this roller $e$ a long lever, $j$, is secured, which is used by the driver, sitting upon the seat E, for moving the lower ends of the shovel-standards upward and forward to the position shown in Fig. 3. The shovel-standards are all thrown up at one movement of the lever $j$, and by bringing this lever beneath the hook $k$, which projects from the axle B, the standards will be sustained in said elevated position.

The rear shovel-standards are pivoted near their upper ends to the rear ends of the longitudinal beams $a\ a$ of the carriage-frame, and have no lateral movement. The forward shovel-standards, D D, are connected to the back of the axle-tree B by means of pivots $i\ i$, which pass through slots $n$, that are made through the standards in a direction with their length, as shown in Figs. 4 and 5. These slots $n\ n$ allow the standards to rise and fall bodily, and also allow their lower ends to be vibrated laterally or in a direction which is across the path of the team.

The two standards D D are connected together so that they can be moved together in a lateral direction, or moved separately up and down, by means of bent rods $r\ r$, which project inward from the upper ends of their respective standards a short distance, and are then bent downward some distance and then carried around the opposite standards, to which they are secured. The lower ends of the rods $r\,r$ are bent around in front of the standards so as to form treadles, upon which the driver places his feet. These rods $r\,r$ are thus made to form levers for enabling the driver to depress either one of the shovel-standards at pleasure, as they are allowed to rise or fall independently of each other, and by depressing one of these standards with sufficient force they will both be moved laterally. The driver can press upon both standards with sufficient force to keep the shovels in the ground at any desired depth, and should the points of these shovels meet with an obstruction in their path the driver can allow them to rise out of the ground by removing his feet from the treadles.

By our invention we can maintain a uniform pressure upon the shovel-standards D D, and at the same time allow them to rise and fall, so that the shovels will accommodate themselves to the uneven surface of the ground, and while this is the case we can regulate the pressure upon the shovel-standards, or remove it entirely at pleasure, while the machine is being drawn along, all of which is effected by the feet of the driver, while his hands are at liberty to control his animals.

The shovels, which are secured to the lower ends of the four standards, may be made of the well-known form represented in the drawings.

Having thus described our invention, what we claim as new, and desire to secure by Letters Patent, is—

1. Applying shovel-standards to a carriage in such manner that they are allowed to rise or fall bodily and independently of each other, and also of being moved laterally together by the feet of the attendant, substantially as described.

2. The slotted shovel-standards D D, in combination with the treadles $r\,r$ and the driver's seat, substantially as described.

3. Connecting the standards D D to the roller $e$ in such manner that their lower ends can be swung forward and upward, in combination with contrivances for allowing said shovel-standards to be adjusted laterally, and also moved up and down in a direction with their length, substantially as described.

4. So constructing the two treadles $r\,r$ that each one serves as a lever and also as a means by which both standards can be moved simultaneously either to the right or to the left, substantially as described.

EDWIN PARMELE.
ROBT. N. PATTERSON.

Witnesses:
JOHN M. DAY,
DANIEL H. HARTWELL.